United States Patent [19]
Young et al.

[11] Patent Number: 4,588,226
[45] Date of Patent: May 13, 1986

[54] ADJUSTABLE CHAIR FOR AIRCRAFT AND THE LIKE

[75] Inventors: Ronald L. Young, Menominee, Mich.; Eugene F. Rock; David E. Brandt, both of Marinette, Wis.

[73] Assignee: ERDA, Inc., Marinette, Wis.

[21] Appl. No.: 565,172

[22] Filed: Dec. 23, 1983

[51] Int. Cl.⁴ .......................... A47C 3/18; B60N 1/02
[52] U.S. Cl. .................................. 297/349; 248/425; 297/344
[58] Field of Search ................... 297/344, 346, 349; 248/424, 425, 429; 108/6; 188/265

[56] References Cited

U.S. PATENT DOCUMENTS

| | | | |
|---|---|---|---|
| 464,588 | 12/1891 | Rollert | 297/347 |
| 629,036 | 7/1899 | Koenigkramer | 297/349 X |
| 935,480 | 9/1909 | Fischer | 297/349 X |
| 2,901,029 | 8/1959 | Thaden . | |
| 3,486,728 | 12/1969 | Naughton . | |
| 3,543,282 | 11/1970 | Sautereau | 108/6 X |
| 3,622,202 | 11/1971 | Brown . | |
| 3,659,895 | 5/1972 | Dresden . | |
| 3,674,308 | 7/1972 | Radding . | |
| 3,860,283 | 1/1975 | Colautti . | |
| 4,097,016 | 6/1978 | Petrucci . | |
| 4,223,947 | 9/1980 | Coeuer | 297/367 |

FOREIGN PATENT DOCUMENTS 463559  5/1975  U.S.S.R. ............................ 297/349

Primary Examiner—William E. Lyddane
Assistant Examiner—Peter R. Brown
Attorney, Agent, or Firm—Schwartz, Jeffery, Schwaab, Mack, Blumenthal & Evans

[57] ABSTRACT

An adjustment mechanism for an aircraft chair in which the chair can be easily and automatically locked in its adjusted or upright position, and unlocked for horizontal swiveling movement. Rotatable cam means are oriented in a locking position such that the chair seat is locked against the base. When the cam means is rotated the brakes are unlocked thereby permitting horizontal or swiveling movement of the chair seat relative to the base.

11 Claims, 6 Drawing Figures

ADJUSTABLE CHAIR FOR AIRCRAFT AND THE LIKE

BACKGROUND OF THE INVENTION

The present invention relates as indicated to an adjustable chair for aircraft, and relates more particularly to a chair having a single mechanism by means of which lateral, longitudinal and swiveling movement can be effected.

Many airplanes, particularly corporate aircraft, have club or lounge sections equipped with chairs capable of various adjustments, including fore-and-aft, lateral, swiveling, and reclining movement, or various combinations of these. At least during takeoff and landing, the chair is normally locked in a fore or aft facing position with the back in a upright position. When the aircraft is not in a takeoff or landing mode, the chair can be moved in the directions indicated, swiveled, or reclined to any desired position of the occupant, within the travel limits of the chair mechanism.

Prior to the present invention, adjustable chairs of the type described normally accommodated longitudinal and lateral travel by tracks, with the actual movement being performed manually or by power assisting means including pins or friction locking. Heretofore, the swiveling movement of the chair has normally been indexed by means of pins.

Regardless of the type of mechanism employed for accomplishing movement in the several directions indicated, prior art adjustable chairs of this general type have been commonly characterized as having a non-rigid feeling when locked, have been relatively inconvenient to adjust by virtue of the locking pins which require manipulation by the occupant, and by the relatively limited positions of movement. Where a wide range of movement has been provided for in prior art adjustable chairs, the mechanisms permitting such adjustments have been uniformly characterized by their relatively complicated and thus costly construction.

SUMMARY OF THE INVENTION

With the above in mind, a principal objective in accordance with the present invention is to provide an adjustable chair provided with a single mechanism by means of which the chair can be locked into position, or unlocked for horizontal or swiveling movement. The mechanism includes a lever accessible to the occupant adjacent the top and front of one of the arms of the chair, or any other conveniently accessible position on the movable seat.

The mechanism permitting adjustment of the chair is further characterized in that when locked, a rigid friction lock is effected between the stationary supporting base for the chair and the seat base. This rigidity is important not only in permitting the chair to be absolutely maintained in its locked position, but essentially eliminates any movement between the seat base and the stationary supporting base which might lead to impaired operation of the adjustment mechanism.

A still further advantage of the adjustment mechanism is its simplified construction and consequent low manufacturing costs. There are a minimum of moving parts involved, thereby reducing maintenance problems and costs. The relatively simple construction permits part of the mechanism to be mounted within the seat portion of the chair, thereby greatly reducing the components exposed at the exterior of the chair. This permits the adjustment mechanism to be readily adaptable to various chair configurations, and also to constructions other than chairs where lateral and longitudinal motion is desired to be provided for but in a controlled manner.

A still further, significant advantage of the invention is the infinite positions of movement into which the seat can be adjusted. There are limits to lateral and longitudinal sliding movement of the seat relative to the supporting base, but within these limits the seat can be moved to an almost infinite number of positions, and subsequently locked. This permits the seat to be moved to the most comfortable position for the occupant.

These and other objects will become apparent as the following description proceeds, in particular reference to the application drawings.

BRIEF DESCRIPTION OF THE APPLICATION DRAWINGS

In the application drawings:

FIG. 6 is a fragmentary view taken on line 6—6 of FIG. 4, showing the lower brake plate, post and shaft.

DETAILED DESCRIPTION OF THE PREFERRED EMBODIMENTS

Figure 1:
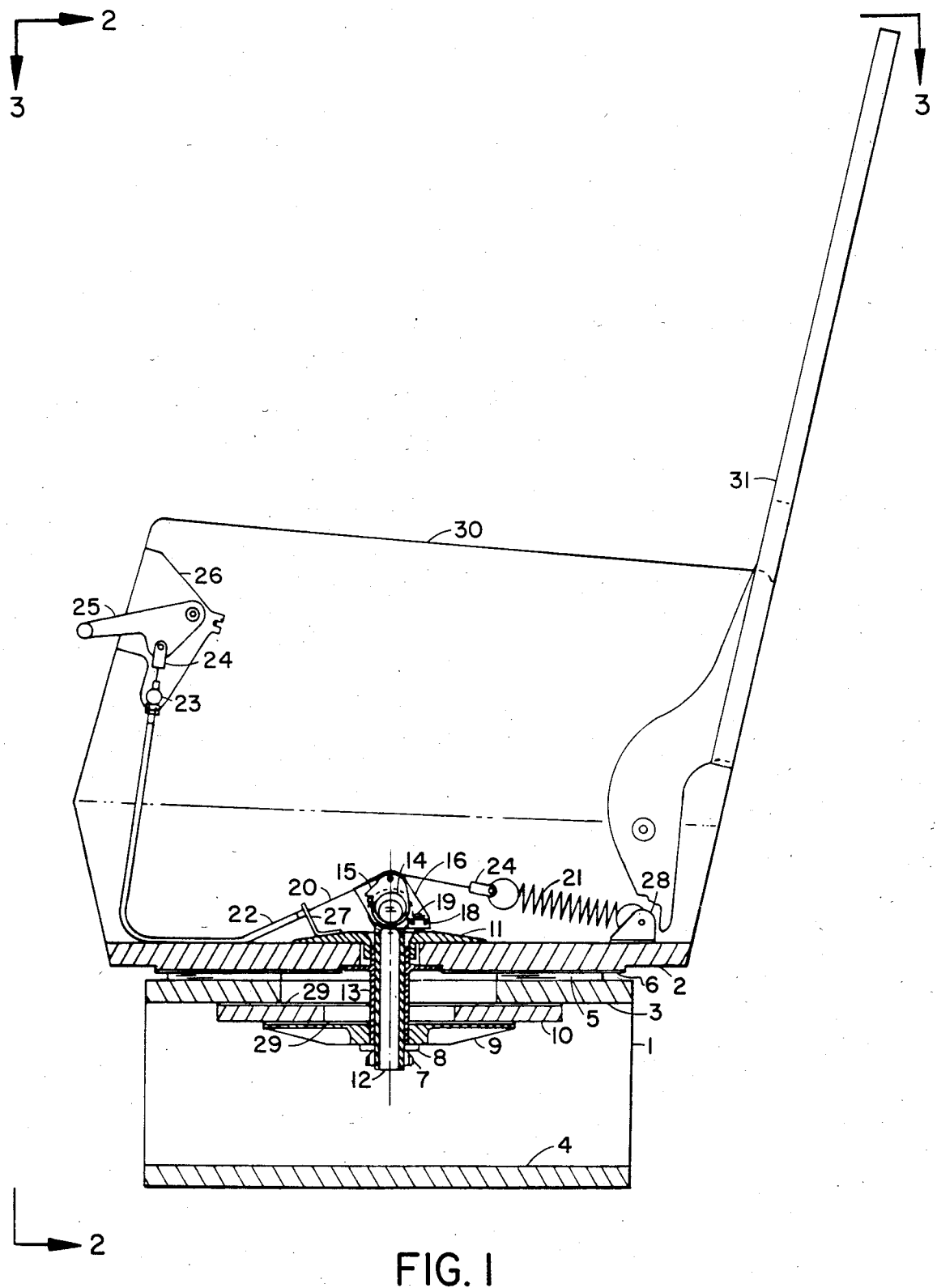
FIG. 1 is a side elevational view, partially in vertical section, showing the adjustable chair constructed in accordance with the present invention.
Figure 2:
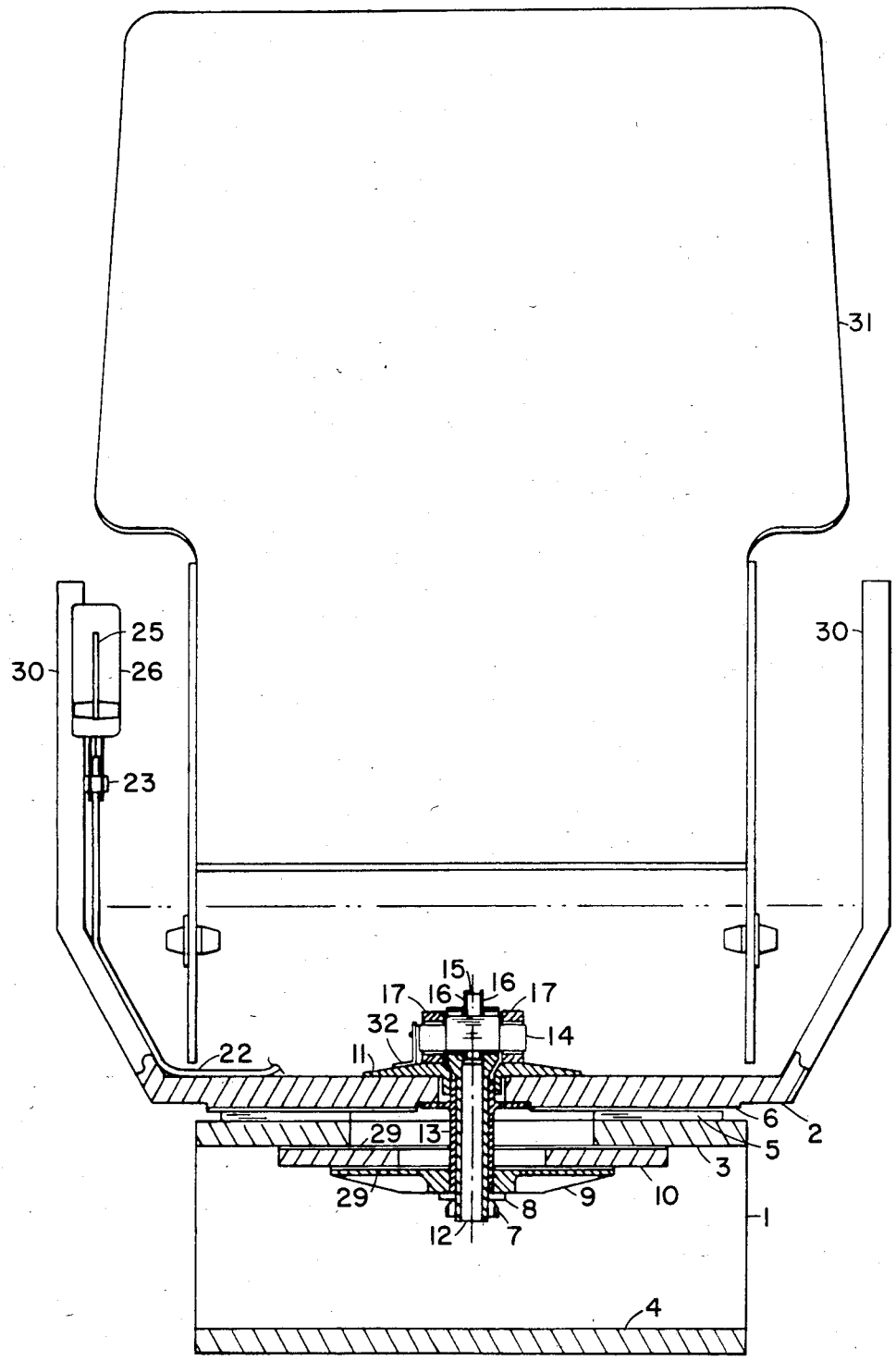
FIG. 2 is an end elevational view, also partially in section, taken in the direction indicated by line 2—2 of FIG. 1, and showing the adjustable chair in accordance with the invention.

Referring now to the application drawings, wherein like parts are indicated by like reference numerals, and initially to FIGS. 1 and 2, the adjustable chair of the present invention is generally indicated at 1, with the seat structure 2 of the chair being mounted on a supporting base which includes a top plate 3 and a bottom plate 4. These plates are interconnected in any suitable, well-known manner to form therebetween an open area receiving the locking mechanism in accordance with the invention. If desired, the top plate 3 can be secured to a tubular bottom member 4. Regardless of the shape of the member 4, it is rigidly secured to the aircraft.

Figure 3:
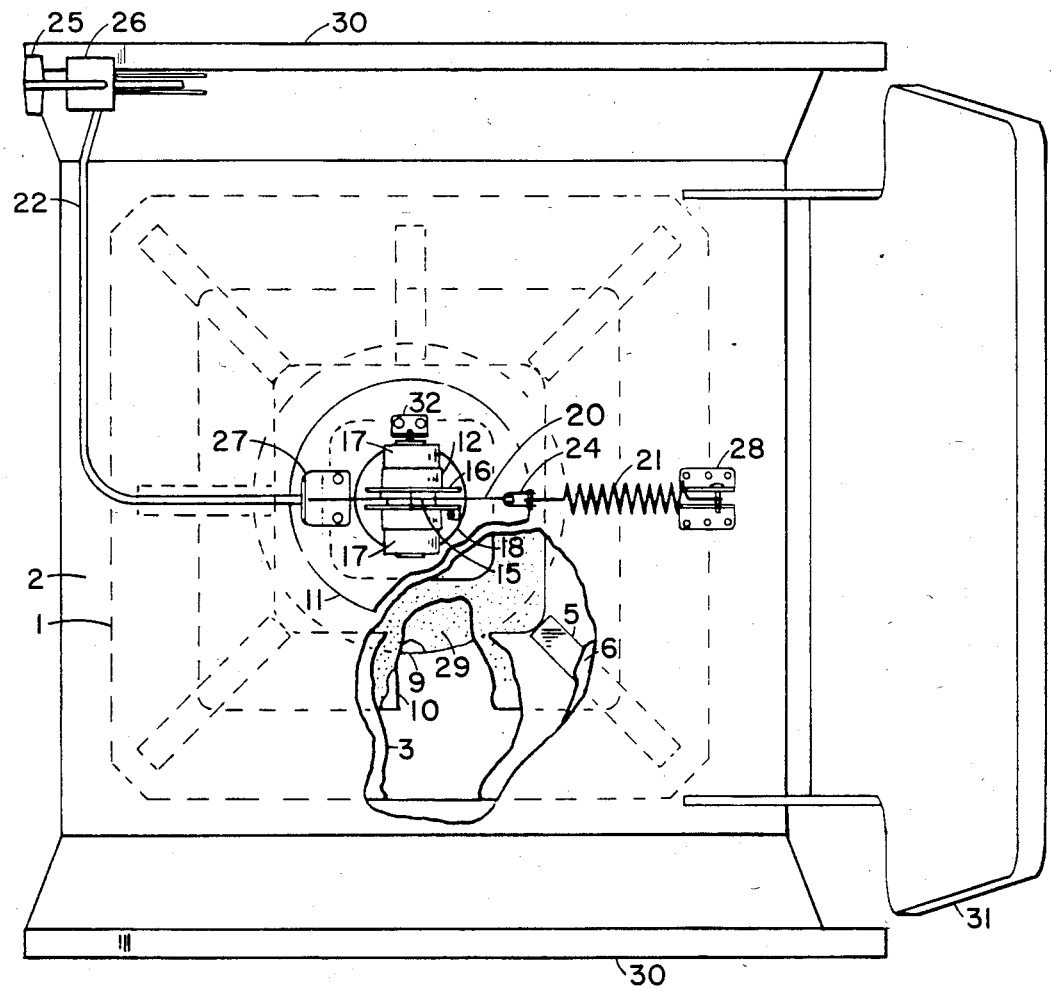
FIG. 3 is a top plan view of the chair of FIG. 1, with certain parts of the chair seat being removed to show the adjustment mechanism.

Interposed between the bottom of the seat 2 and the top surface of the plate 3 is a bearing 5 which has been shown diagrammatically (FIG. 3). As can be seen in FIG. 3, the bearing 5 comprises individual radially extending segments mounted on the top surface of the base member 3 and which collectively permit free motion of the seat when the seat is in an unlocked mode. When the seat is locked, the bearings do not override the brakes, that is, the seat cannot be moved or swiveled before unlocking of the brake plates. The bearing 5 is formed from a material having a low coefficient of friction, with any suitable material being capable of use. The bottom surface of the seat 2 is formed with a metal sliding surface 6 which cooperates with the segmemts of the bearing 5 to form a dry maintenance-free bearing to facilitate movement of the seat relative to the base support.

Figure 4:
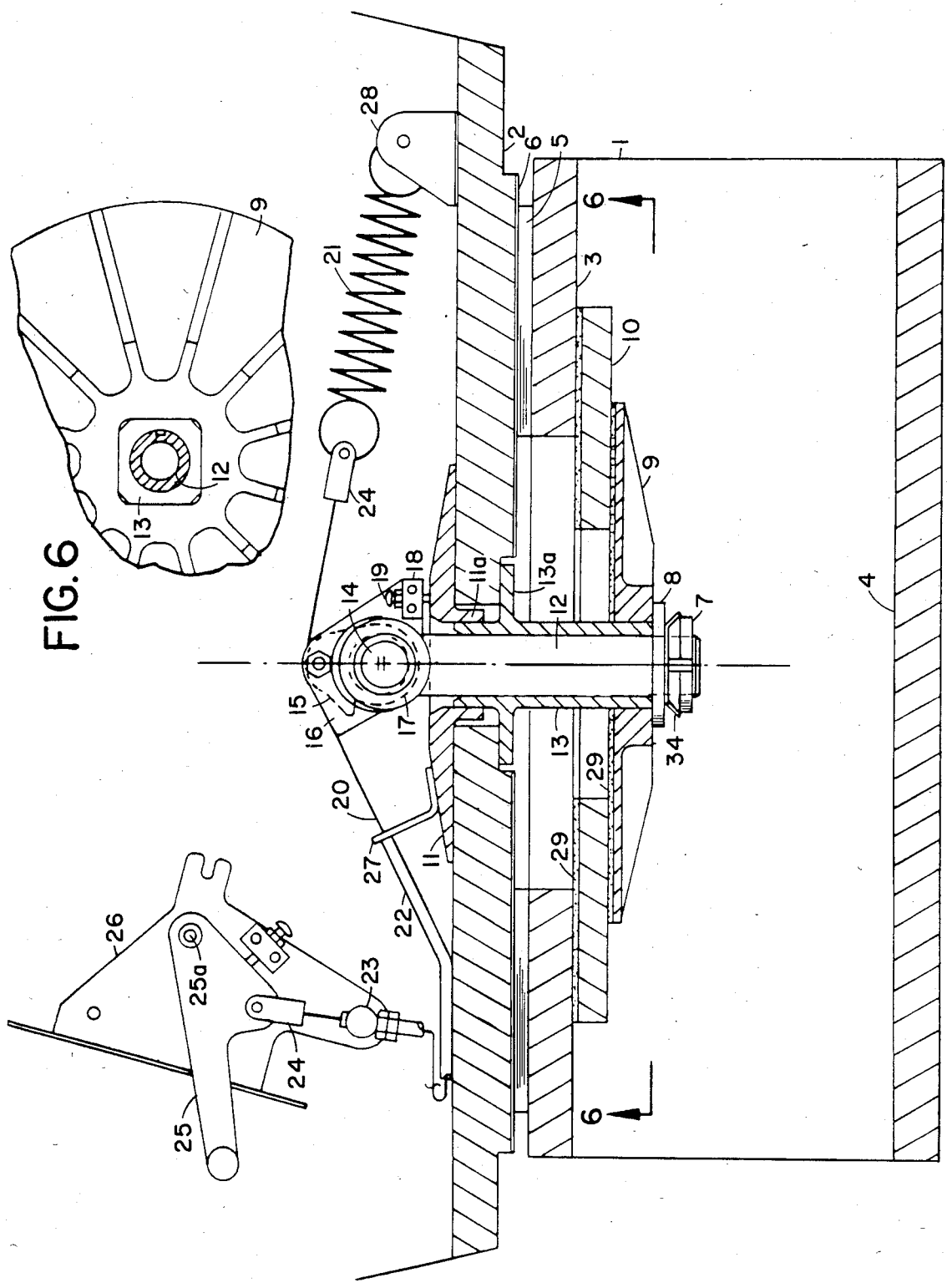
FIG. 4 is an enlarged vertical sectional view of the adjustment mechanism, shown in a locked position.
Figure 5:
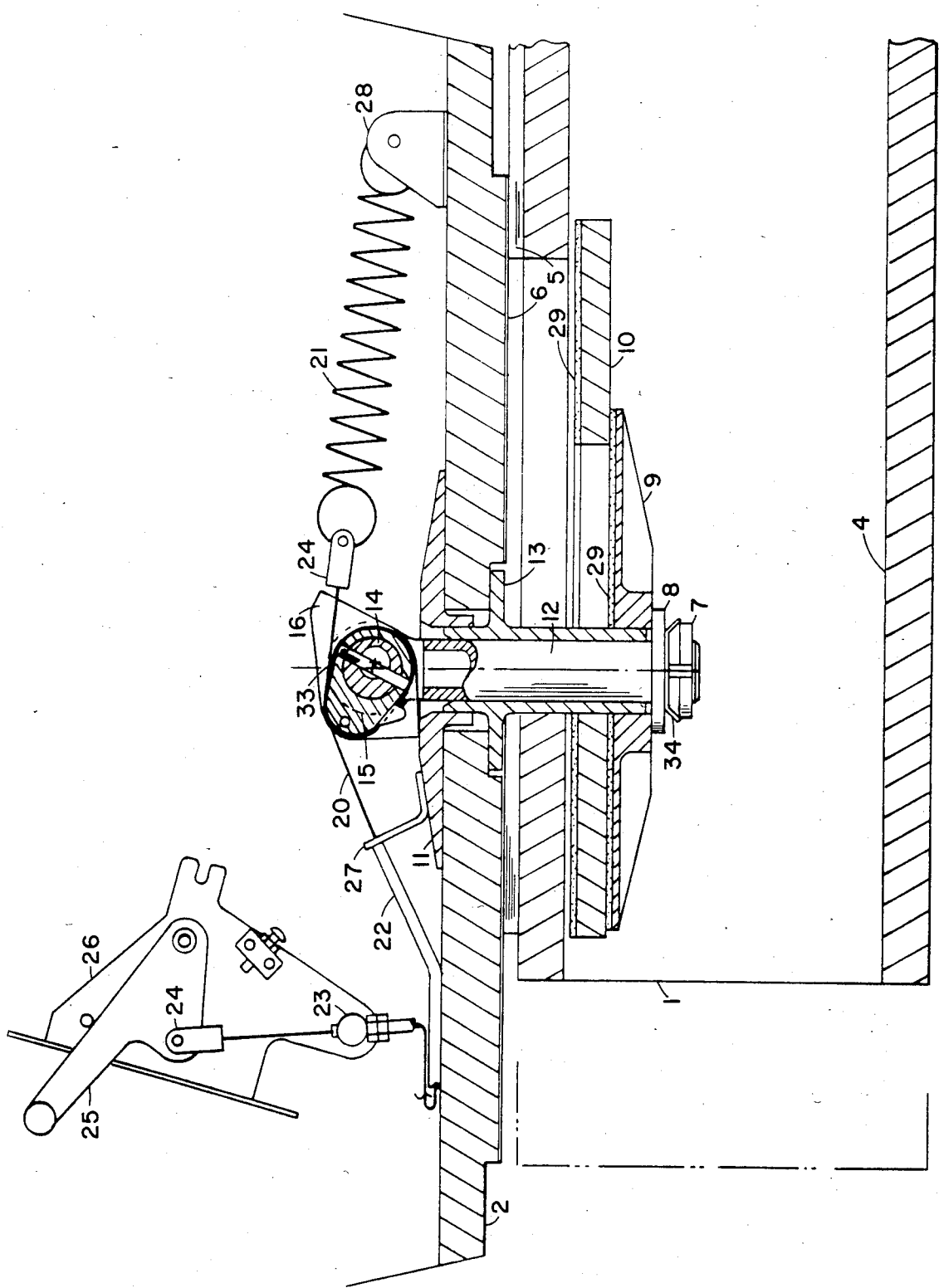
FIG. 5 is an enlarged vertical sectional view similar to FIG. 4, but showing the adjustment mechanism in an unlocked position.

As best shown in FIGS. 4 and 5, mounted below the top base plate 3 are upper and lower brake plates 10 and 9, respectively. The assembly is shown locked in FIG. 4, and the brake plates in FIG. 4 are generally concentric relative to a generally central opening formed in the base plate 3. The upper brake plate 10 is also formed with an opening around the post 13, with the openings in the top plate 3 and upper brake plate 10 permitting longitudinal sliding movement of the seat relative to the stationary base. In FIG. 5, which shows the seat unlocked and moved forwardly, the post 13 is shown in its forward most position of adjustment, in which it engages the walls defining the forward edges of the openings in the top plate 3 and brake plate 10.

The top surfaces of the brake plates 9 and 10 are formed with pads of friction material commonly designated at 29, by means of which the seat 2 can be locked or restrained in its adjusted position, as will be described in detail hereinbelow.

Positioned within the post 13 is shaft 12, the lower end of which has positioned therearound a washer 8, a lock washer 34, and a nut 7. In this manner, the shaft, and thus the seat 2, can be adjustably locked to the base plate, with the removal of the nut 7 permitting the seat structure to be removed from the base.

The seat 2 is formed with a central opening into which the upper part of the post 13 extends with clearance. The post is formed with a radial flange 13a which is received in an annular groove formed in the bottom surface of the seat surrounding the central opening. Positioned around the upper end of the post 13 is an annular flange or sleeve 11a formed on plate 11, the main body of which extends over and is contiguous with the top surface of the seat 2. A cam 14 similar in shape and function to a crankshaft is positioned at the upper end of the shaft 12 and is rotatable relative thereto. Referring to FIG. 2, the ends of the cam 14 are eccentric to the cam body and form bearings mounted within rollers 17, the rollers being mounted on the top surface of the plate 11. A cam reel 15 is mounted around the center of the cam 14, with stop plates 16 being mounted on each side of the cam reel. Referring again to FIGS. 3 and 4, at least one stop plate 16 has mounted thereon a stop block 18 provided with a stop adjustment screw 19 the outer end of which is adapted to contact and engage the top surface of the plate 11 in the FIG. 4 position of the members. This maintains the cam and cam reel in a vertically oriented position, under spring bias, when the seat is locked.

A cable 20 is employed to rotate the cam 14 and cam reel 15, with the cable being connected adjacent the rear of the seat to a clevis 24 which is in turn secured to the forward end of a preloaded extension spring 21. The opposite end of the spring 21 is secured to a spring bracket 28 mounted on the top of the seat 2.

The forward end of the cable 20 extends through a cable sheath 22 which is fixed at its upper end to a trunnion 23. The cable extends through the trunnion 23 and is secured to a clevis 24a which is in turn connected to operating lever 25. The lever is pivotally connected as shown at 25a to a lever support member 26 which is mounted on the chair arm 30 for convenient manipulation by the occupant. Although the lever is shown mounted on the right most arm 30 of the chair, reference being made to FIGS. 2 and 3, it will be apparent that the sheath 22 could be directed in the opposite direction and the lever and lever support mounted on the left chair arm, shown at the right in FIG. 2, or to any other position convenient to the occupant for operation.

The cable is wrapped around the cam reel 15, as best shown in FIG. 5, whereby movement of the operating lever 25 to its FIG. 5 position results in rotation of the cam and cam reel, against the bias of spring 21. The cable is preferably secured to the cam reel by tangs or the like to secure its engagement and thus ensure rotation of the cam reel when the cable is actuated to unlock the brake plates.

The chair further includes a chair back 31 which is pivotally mounted to a stationary back support (not shown) for reclining movement of the back. It will be understood that the arms 30 and chair back 31 are shown generally diagrammatically and per se form no part of the present invention. The arms and back can be provided with upholstered fabric in the usual fashion.

Referring to FIG. 3, a bracket 32 is mounted on the plate 11, with the bracket being generally L-shape (not shown) and provided with an opening in the vertical leg thereof for receiving a reduced diameter pin of the cam 14. Thus, the cam is precluded from horizontal movement.

The cam 14 is keyed to the cam reel 15 by means of pin 33, FIG. 5. Thus, rotation of the cam reel 15 by the cable 20 results in simultaneous rotation of the cam 14 whereby the eccentrical shape of the cam 14 effects vertical downward movement of the shaft 12.

Referring now to the operation of the adjustment mechanism, the seat is shown in its locked position in FIG. 4. In such position, the cam reel 15 and cam 14 are in a generally vertical plane, and are kept in this position by means of the extension spring 21. The stop adjustment screw 19 accurately positions the "at rest" orientation of the cam. When in such position, the cam and cam reel are relatively elevated, as is the shaft 12, thereby locking the lower brake 9 to the upper brake 10, which is in turn locked to the top plate 3 of the base. Thus, the seat is locked against horizontal or swivel movement, with such locking, as above noted, overcoming the bearing 5. The cam 14 is constructed and arranged such that the eccentric displacement thereof is vertical, with its center portion being higher than its end portions. This arrangement produces a non-linear vertical motion of shaft 12 which results in a high mechanical advantage in the operation of the brake mechanism by the occupant. It should be noted that the nut 7 is adjusted until the spring 21 can just overcome the system resulting in the braking effect, with the nut 7 in such position being locked by the lock washer 34.

To release the mechanism to permit horizontal or swiveling movement of the seat, the lever 25 is moved upwardly to its FIG. 5 position as a result of which the cable 20 is moved in the same direction, thereby rotating the cam reel 15 and the cam 14 which is keyed thereto by pin 33. Due to the eccentric cross-sectional shape of the cam 14, the post or shaft 12 is moved downwardly along with the brake plates 9 and 10. By so releasing the brake plates, the seat structure 2 is allowed to move horizontally or swivel relative to the support, with the metal sliding surface 6 of the seat 2 sliding or swiveling on the segmented bearing 5. When the proper position of the seat is attained, the lever 25 is released, with the spring 21 returning, through cable 20, the cam 14 and cam reel 15 to its vertically oriented, FIG. 4, position as above described, to again lock the seat in its position of adjustment.

It will thus be seen that the present invention constitutes an adjustment mechanism which is highly simplified in construction, and easy to use. Very few moving parts are involved, and by release of the mechanism through the operating lever, the chair seat can be moved to its adjusted position and thereafter locked simply by releasing the operating lever.

It will be understood that changes can be made in the system without departing from the basic inventive concepts. For example, the cam and cam reel can be rotated to release the brake plates by means other than the cable illustrated. A torque producing mechanism could be employed for that purpose, or a power assisted device could also be utilized. The important point is that the cam and cam reel are rotated responsive to actuation of an operating member, for example, operating lever 28, and are returned to a position (FIG. 4) in which the brake plates automatically lock the seat to the base. Resilient biasing means efficiently accomplish the latter objective, although other means could be employed to return the cam and cam reel to their FIG. 4 position.

We claim:

1. An adjustment mechanism for a chair to permit horizontal and swiveling movement of the chair, comprising:
    (a) a base including a top plate member, said top plate member being provided with a central opening;
    (b) a rigid seat forming the bottom of said chair, said seat being formed with an opening;
    (c) bearing means interposed between the bottom of said seat and the top of said top plate of said base to permit horizontal or swiveling movement of said seat, and thus said chair, relative to said base;
    (d) a center post connected to said seat and extending downwardly through said openings in said seat and said top plate of said base, said central opening in said top plate being sufficiently large to accommodate longitudinal and trasverse movement of said post and thus of said seat;
    (e) a shaft positioned within said post for vertical movement within said post;
    (f) brake means supported on the bottom of said shaft and adapted to tightly frictionally engage the top plate of said base for locking the seat in its adjusted position, said brake means including a lower brake plate and an upper brake plate, said lower brake plate being connected to said shaft for movement therewith, said upper brake plate being positioned between said lower brake plate and said top plate, said upper brake plate being formed with a generally central opening sufficiently large to accommodate longitudinal and transverse movement of said post and shaft, said central opening of said upper brake plate being smaller than said opening of said top plate member and said upper brake plate being dimensioned to overlap both the lower brake plate and the top plate;
    (g) eccentric cam means operatively engaging the upper end of said shaft, and
    (h) means operatively connected to said cam means for rotating the same for vertically moving said shaft to release said brake means, and resilient means for thereafter returning said cam means to its original position again locking the seat, in its adjusted position, to said base.

2. The adjustment mechanism of claim 1 wherein said means operatively connected to said cam means comprises a cable secured at one end to operating means on said chair, and at its other end to resilient means biasing said cam means to a position wherein said shaft is elevated and said brake means engage said top plate of said base for locking said seat,
    whereby movement of said cable by said operating means in a direction opposite to the force of said resilient biasing means causes said cam means to rotate thereby moving said shaft downwardly to disengage said brake means and permit horizontal and swiveling movement of said seat.

3. The adjustment mechanism of claim 2 wherein said cable extends through a sheath in its forward direction and is connected to a clevis which in turn is connected to said operating lever, said cable being wrapped around said cam means, with the opposite end of the cable being secured to a clevis which is in turn connected to said resilient biasing means, the latter being mounted at its opposite end to said seat.

4. The adjustment mechanism of claim 1 wherein the top surface of said lower brake plate and said upper brake plate are formed with brake friction material.

5. The adjustment mechanism of claim 4 wherein said lower brake plates includes a hub portion non-rotatably mounted around said posts, with said lower brake plate being vertically secured to said shaft by means of a nut and lock washer.

6. The adjustment mechanism of claim 1 wherein said center post is formed with a radial flange positioned in an undercut groove formed in the bottom surface of said seat member surrounding said central opening therein, the upper end of said post extending into a central sleeve of a plate positioned on top of said seat around the central opening formed therein.

7. The adjustment mechanism of claim 1 wherein said eccentric cam means comprises an eccentric cam and a cam reel positioned around said cam, and pin means for securing said cam and cam reel together for joint rotative movement, said cable being wrapped around said cam reel and secured at its adjacent end to said resilient means, and further including means associated with said cam and cam reel for orienting the same in a substantially vertical position, under the bias of said resilient means, when said operating means is not engaged.

8. The adjustment mechanism of claim 7 further including stop plates mounted on said cam reel on either side of said cable for guiding the same, and wherein said means for orienting said cam and cam reel in a generally vertical direction comprises a stop block and a stop adjustment screw mounted on one of said stop plates.

9. The adjustment mechanism of claim 1 further including a plate positioned around said central opening in said seat, said plate having a downwardly extending sleeve receiving the upper end of said post, and wherein said cam means include bearing ends mounted within rollers which engage the top surface of said plate surrounding said central opening in said seat.

10. The adjustment mechanism of claim 1 wherein said brake means comprises upper and lower brake plates the top surfaces of which are formed with brake friction material, the lower brake plate during locking of said adjustment mechanism engaging the bottom surface of said upper brake plate, and the upper surface of said upper brake plate engaging the underside of said top plate of said base, said center post in the vicinity of said lower brake plate being formed with a non-circular radial extension, and said lower brake plate being formed with an annular hub of similar non-circular cross section thereby preventing rotation of said lower brake plate relative to said post.

11. The adjustment mechanism of claim 1 further including a bearing interposed between said seat and the top surface of said top plate member, said bearing comprising a plurality of individual, radially extending bearing segments which allow free movement of said seat when unlocked but which do not override the braking effect when the brake plates are locked.

* * * * *